United States Patent [19]

Simon, Jr. et al.

[11] Patent Number: 5,394,327
[45] Date of Patent: Feb. 28, 1995

[54] TRANSFERABLE ELECTRONIC CONTROL UNIT FOR ADAPTIVELY CONTROLLING THE OPERATION OF A MOTOR VEHICLE

[75] Inventors: Robert C. Simon, Jr., Novi; Joseph M. Tolkacz, Warren; Steven J. Swantick, Livonia, all of Mich.; Dennis D. Thompson, Atlanta; Douglas J. Tackitt, Kokomo, both of Ind.

[73] Assignees: General Motors Corp., Detroit, Mich.; Delco Electronics Corp., Kokomo, Ind.

[21] Appl. No.: 967,871

[22] Filed: Oct. 27, 1992

[51] Int. Cl.⁶ .............................................. G06F 15/20
[52] U.S. Cl. ............................ 364/424.01; 364/148; 364/424.05; 364/425; 364/431.12; 395/905
[58] Field of Search ...................... 364/424.01, 424.03, 364/424.04, 424.05, 425, 148, 149, 151, 157, 164, 165, 431.04, 431.11, 431.12; 395/905

[56] References Cited

U.S. PATENT DOCUMENTS

| | | | |
|---|---|---|---|
| 4,084,240 | 4/1978 | Lappington | 364/425 |
| 4,348,729 | 9/1982 | Sasayama et al. | 364/431.12 |
| 4,441,359 | 4/1984 | Ezoe | 364/424.03 X |
| 4,460,035 | 7/1984 | Mizote et al. | 364/148 X |
| 4,700,677 | 10/1987 | Bonitz et al. | 123/425 |
| 4,737,914 | 4/1988 | Abe et al. | 364/431.04 |
| 4,751,633 | 6/1988 | Henn et al. | 364/425 X |
| 4,829,439 | 5/1989 | Otobe | 364/431.04 |
| 4,829,440 | 5/1989 | Abe | 364/431.12 X |
| 4,868,755 | 9/1989 | McNulty et al. | 395/905 X |
| 4,975,846 | 12/1990 | Abe et al. | 364/424.03 |
| 4,975,848 | 12/1990 | Abe et al. | 364/424.03 |
| 5,001,645 | 3/1991 | Williams et al. | 364/148 X |
| 5,021,958 | 6/1991 | Tokoro | 395/905 X |
| 5,041,976 | 8/1991 | Marko et al. | 364/424.03 |
| 5,050,562 | 9/1991 | Ishii et al. | 364/431.11 X |
| 5,080,064 | 1/1992 | Buslepp et al. | 123/399 |
| 5,200,898 | 4/1993 | Yuhara et al. | 395/905 X |
| 5,200,900 | 4/1993 | Adrain et al. | 364/431.12 |
| 5,233,964 | 8/1993 | Jamoua et al. | 364/431.12 X |

OTHER PUBLICATIONS

"Automotive Control System Diagnostics Using Neural Nets for Rapid Pattern Classification of Large Data Sets" by Kenneth A. Marko et al., IJCNN, Jun. 1989, pp. I-13-I-16.

*Primary Examiner*—Kevin J. Teska
*Assistant Examiner*—Collin W. Park
*Attorney, Agent, or Firm*—Jimmy L. Funke; Michael J. Bridges

[57] ABSTRACT

A transferable electronic control unit having a non-volatile memory that retains values of learned correction factors for control parameters used in adaptively controlling the operation of a vehicle is disclosed. The electronic control unit receives an identification signal from the vehicle in which it operates. By comparing the value of the received identification signal with a stored value identifying the vehicle operated when learning the values of the correction factors that are stored in non-volatile memory, the electronic control unit determines whether or not it has been transferred between vehicles. When a transfer between vehicles has not occurred, the value of the learned correction factors stored in non-volatile memory are used to begin adaptively controlling vehicle operation. When a transfer between vehicles has occurred, initial or mean values for the correction factors are used to begin adaptively controlling vehicle operation. As a result, the electronic control unit can be transferred between vehicles without causing malfunctions in vehicle operation.

8 Claims, 6 Drawing Sheets

TRANSFERABLE ELECTRONIC CONTROL UNIT FOR ADAPTIVELY CONTROLLING THE OPERATION OF A MOTOR VEHICLE

BACKGROUND OF THE INVENTION

The present invention relates generally to the field of adaptive control systems, and more particularly, to an electronic control unit for adaptively controlling the operation of a motor vehicle, where the electronic control unit retains values of control parameter correction factors learned during vehicle operation and can be transferred from one vehicle to another.

It is known that a microprocessor based adaptive control system can be utilized to greatly improve vehicle powertrain (engine and/or transmission) performance. In such systems, control parameters, such as those used for regulating idle air flow, engine fueling, spark timing, exhaust emissions, transmission shifting, etc., are generally initialized to predetermined mean values provided from a programmable read only memory (PROM) in an electronic control unit (ECU) when the vehicle is operated for the first time. Thereafter, correction factors for the control parameters are learned based upon known adaptive control algorithms when the vehicle is operational. The learned correction factors are then used to adjust the control parameters to optimized values, thereby improving vehicle response and drivability, while compensating for aging and variations in powertrain components due to production tolerances.

The learned values of correction factors are generally stored in a keep alive memory (KAM) in the ECU so they can be retained when the vehicle is not operational. In the past, the KAM has been provided by maintaining vehicle battery power to conventional random access memory (RAM) when the vehicle ignition system is switched off. One major disadvantage associated with using of this type of KAM for storage is that the learned values of the correction factors will be lost if the vehicle battery fails or is disconnected from the ECU.

Recently, electrically erasable programmable read only memory (EEPROM) devices have been used to replace the KAM for storing values of learned correction factors in vehicle adaptive control systems. The learned values for the correction factors are easily stored in the non-volatile EEPROM devices when the vehicle is not operational, and there is no risk of losing the stored values if the vehicle battery fails or is disconnected from the ECU.

The use of EEPROM for storing the learned correction factors has been found to present a problem in the vehicle servicing environment. A common service procedure used in diagnosing a potentially defective ECU involves transferring the ECU from a first vehicle that requires servicing to a second vehicle that is known to be operating properly. If the second vehicle is then found to operate improperly with the transferred ECU, it is concluded that the ECU is defective. However, this may not be correct due to the presence of the EEPROM device in the transferred ECU.

Since the EEPROM retains the values of the correction factors learned while operating the first vehicle, the adaptive control system of the second vehicle applies these same values to control its own powertrain. Due to the differences between the powertrain components in the first and second vehicles, it is quite possible for the second vehicle to operate improperly when its adaptive control system uses the retained correction factors learned for the first vehicle. This of course would lead to the erroneous conclusion that the ECU is malfunctioning, when it is actually operating properly.

In view of the foregoing, there exists a need for a method and apparatus for detecting when an electronic control unit is transferred from a first vehicle to a second vehicle and for preventing an adaptive control system in the second vehicle from using correction factors learned and stored in the electronic control unit while it was adaptively controlling the operation of the first vehicle.

SUMMARY OF THE INVENTION

The general object of the present invention is to provide an electronic control unit having a non-volatile memory that retains values of learned correction factors for control parameters used in adaptively controlling the operation of a vehicle, with the electronic control unit having the capability of being transferred between vehicles without causing vehicle malfunctions or degraded performance.

This and other objects of the present invention are achieved by enabling the electronic control unit to determine whether it has been transferred to a vehicle different from one operated when learning the correction factors retained in non-volatile memory. When the electronic control unit determines that it has not been transferred to a different vehicle, the learned values of the correction factors retained in non-volatile memory are used to begin adaptively controlling vehicle operation. When the electronic control unit determined that it has been transferred to a different vehicle, initial (or mean) values are used for the correction factors to begin adaptively controlling vehicle operation. Consequently, when the electronic control unit is transferred from a first vehicle to a second vehicle, the second vehicle will be operated using initial values for the correction factors, rather than values learned during the operation of the first vehicle. This prevents possible malfunctioning of the second vehicle when it is operated with the transferred control unit.

The present invention is particularly useful in the servicing environment where a common servicing practice is to transfer an electronic control unit that is suspected of being defective to a second vehicle, and then judging the electronic control unit to be defective if the second vehicle malfunctions. The present invention prevents the second vehicle from malfunctioning due to the use of correction factors learned while operating the first vehicle. Consequently, possibility of incorrectly judging an electronic control unit to be defective is greatly reduced.

In the preferred embodiment of the invention, the electronic control unit receives an identification signal from the vehicle in which it is currently operating. By comparing the value of the identification signal with a saved value identifying the vehicle that was operated when learning the values of the correction factors saved in non-volatile memory, it can be determined whether or not the electronic control unit has been transferred between vehicles.

In one implementation of the present invention, the value of identification signal received from the vehicle represent a vehicle identification number, while in another implementation, the received identification signal represents the vehicle odometer value.

These and other aspects and advantages of the invention may be best understood by reference to the following detailed description of the preferred embodiment when considered in conjunction with the accompanying drawings.

DESCRIPTION OF THE PREFERRED EMBODIMENT

In the description that follows, similar parts or structures used in the figures will be designated with like numerals, and where such parts and structures have been previously discussed with respect to an earlier figure, the description will not be repeated. Also, since the present invention resides primarily in a novel combination and the method of operation of well-known components and devices used in vehicle adaptive control systems, and not in the specific detailed structure thereof, the structure, control, and arrangement of these well-known components and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein.

Figure 1:
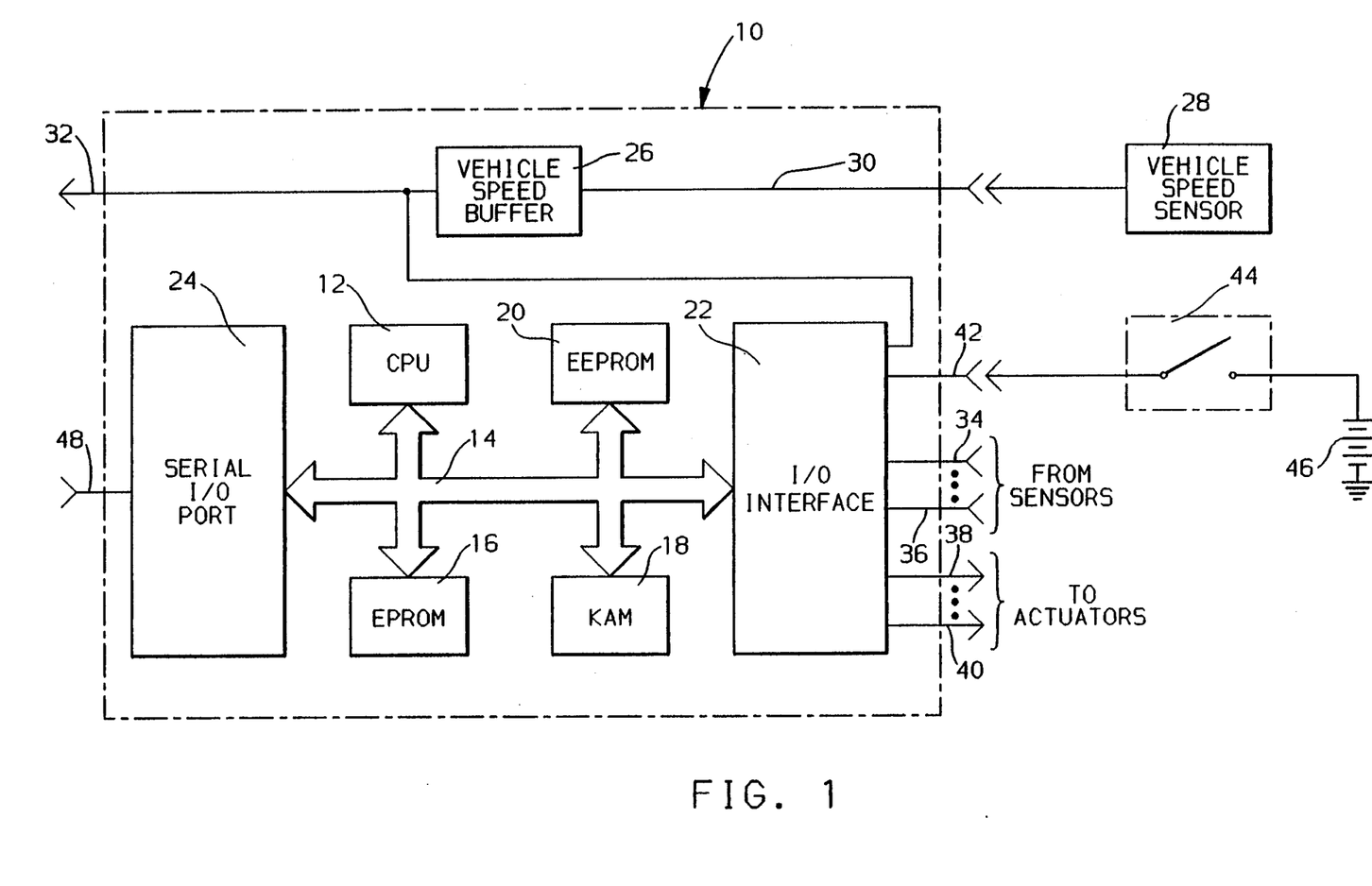
FIG. 1 illustrates in block diagram form, an electronic control unit (ECU) for adaptively controlling a vehicle engine and/or transmission in accordance with the principles of the present invention.

Referring now to FIG. 1, there is shown in block diagram form, an electronic control unit (ECU) generally designated by the numeral 10, that operates in accordance with the principles of the present invention to adaptively control the operation of a vehicle powertrain (engine and/or transmission). The ECU 10 includes a central processing unit (CPU) 12 that communicates, by way of a common bus system 14, with an electrically programmable read only memory (EPROM) 16, a keep alive memory (KAM) 18, an electrically erasable programmable read only memory (EEPROM) 20, an input/output (I/O) interface device 22, and a serial I/O port 24.

The ECU 10 also contains a vehicle speed buffer 26, which receives a signal from a vehicle speed sensor 28 via line 30. Vehicle speed sensor 28 can be any type of sensor known in the art, as for example, a conventional variable reluctance sensor adapted to measure the angular rotation of the vehicle drive shaft. The vehicle speed buffer 26 contains circuitry for receiving the signal provided by the vehicle speed sensor 28, and for conditioning the received signal to generate a pulsed signal on line 32, where the pulsed signal has a frequency proportional to the vehicle speed. For example, if a variable reluctance sensor is employed as the vehicle speed sensor 28, the vehicle speed buffer 26 would typically contain standard threshold circuitry for squaring up the sinusoidal signal generated by the variable reluctance sensor on line 30. Note that pulsed output signal from the vehicle speed buffer 26 also acts as an input to the I/O interface 22 via line 34, thereby providing the ECU 10 with an indication of vehicle speed for controlling the powertrain.

The CPU 12 within ECU 10 executes an operational program which is permanently stored in EPROM 16 along with initialization and calibration values, constants, and standard lookup tables customarily used when adaptively controlling vehicle powertrain components. The keep alive memory (KAM) 18 is used for storing computed values during program execution, while the EEPROM 20 provides non-volatile memory for assuring the long term storage of values when the vehicle is not operational. Values stored in KAM 18 will also be retained as long as the KAM 18 is provided with electrical power. Thus, the KAM 18 acts as backup memory in case of EEPROM 20 failure.

The I/O interface 22 receives input signals from various standard powertrain sensors (not shown), represented by lines numbered 34 and 36, and provides output signal to drive various standard powertrain actuators (not shown), as represented by the lines numbered 38 and 40. The I/O interface 22 is also shown as receiving a signal on line 42 from vehicle ignition system switch 44 acting in series with vehicle battery 46. The signal on line 42 provides the ECU 10 with an indication as to whether the vehicle ignition key (not shown) is turned to an "on" position (switch 44 closed), or turned to an "off" position (switch 44 open).

Note that the power supply circuitry connecting the ECU 10 and its internal components to the vehicle battery 46 are not shown in FIG. 1, since such circuitry is well known in the art and its inclusion would only serve to complicate the drawing with unnecessary details.

The conventional serial I/O port 24 provides ECU 10 with the ability to send and receive serial data on line 48. The serial I/O port 24 can be implemented with any one of a number of commercially available universal asynchronous receive/transmit (UART) chips. As will be described subsequently, line 48 is used to form a bi-directional serial data link with a vehicle instrument panel (IP) controller, or a vehicle heating, venting, and air conditioning (HVAC) controller, either of which can be connected to the ECU 10 to practice the preferred embodiment of the present invention.

Figure 2:
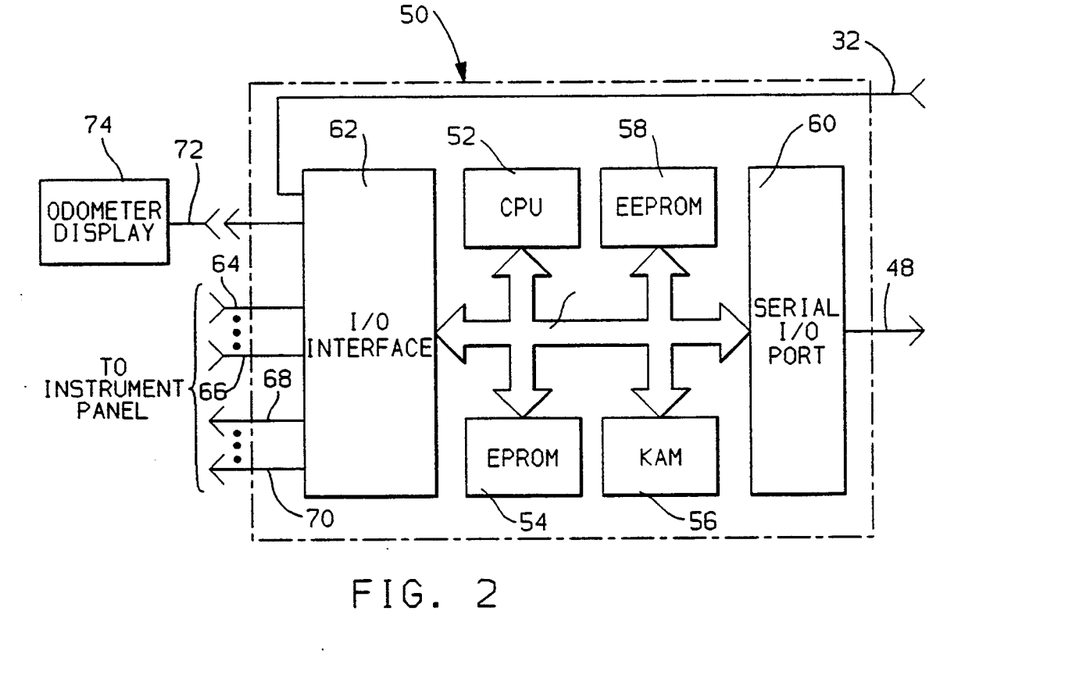
FIG. 2 illustrates in block diagram form, an instrument panel (IP) controller that can be connected to the ECU unit of FIG. 1 to practice the present invention.

Referring now to FIG. 2, there is shown in block diagram form, the instrument panel (IP) controller, generally designated by the numeral 50, that is used for controlling the operation of a vehicle instrument panel (not shown). The basic structure and operation of the IP controller 50 is similar with that of the ECU 10 described earlier. The IP controller 50 includes a CPU 52, an EPROM 54, a KAM 56, an EEPROM 58, a serial I/O port 60, and an I/O interface 62, all connected by a common bus system 64.

In operation, the CPU 52 executes a looped IP program stored in the EPROM 54 to control the vehicle instrument panel. The KAM 56 and EEPROM 58 provide the media for storing data within the IP controller 50. The I/O interface 62 receives signals from the instrument panel, as represented by lines 64 and 66, and sends control signals to the instrument panel, as represented by lines 68, 70, and 72. In particular, line 72 is shown connecting the I/O interface 62 to a vehicle odometer display 74.

In those vehicles that include the IP controller 50, the the pulsed signal having a frequency proportional to vehicle speed from the ECU 10 is provided as an input to the I/O interface 62 via line 32. During the execution of the looped IP control program, the CPU 52 periodically computes an odometer value based upon the number of pulses occurring in the signal provided by the ECU 10 via line 32. The odometer value is stored in KAM 56 during vehicle operation and represents the total number of miles traveled by the vehicle. This odometer value is periodically transmitted to the ECU 10 through the serial I/O port 60 over the bi-directional serial link represented by line 48, and is also used to generate a signal on line 72 for updating odometer display 74.

When the vehicle is powered down by switching off the ignition key, the current odometer value stored in KAM 56 is transferred to EEPROM 58 so it will be available when restarting the vehicle. When the vehicle is started, the odometer value in EEPROM 58 is again transferred to KAM 56 so it can be updated based upon the number of pulses occurring in the signal on line 32.

Figure 3:
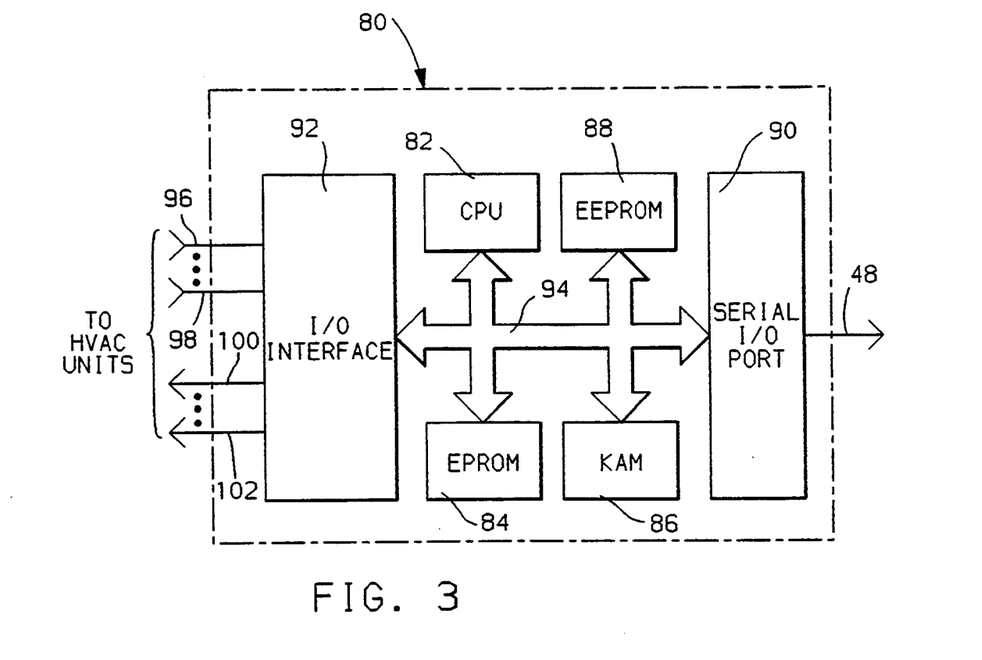
FIG. 3 illustrates in block diagram form, a heating, venting, and air conditioning (HVAC) controller that can be connected to the ECU of FIG. 1 to practice the present invention.

Referring now to FIG. 3, there is shown in block diagram form, a heating, venting, and air conditioning (HVAC) controller, generally designated by the numeral 80, that is used for controlling the operation of vehicle heating, venting, and air conditioning units (not shown). As stated previously, if a given vehicle does not include the IP controller 50, the HVAC controller 80 can be connected to the ECU 10 to practice the preferred embodiment of the invention. Generally, a vehicle will be equipped with one of either the IP controller 50 or the HVAC controller 80, but not with both due to some redundant functions.

The basic structure and operation of the HVAC controller 80 is also similar with that of the ECU 10. The HVAC controller 80 includes a CPU 82, an EPROM 84, a KAM 86, an EEPROM 88, a serial I/O port 90, and an I/O interface 92, all connected by a common bus system 94.

In operation, the CPU 82 executes a looped HVAC program stored in the EPROM 84 to control the vehicle heating, venting, and air conditioning units. The KAM 86 and EEPROM 88 provide the media for storing data within the HVAC controller 80. The I/O interface 92 receives signals from the HVAC units, as represented by lines 96 and 98, and sends control signals to the HVAC units, as represented by lines 100 and 102.

In those vehicles that include the HVAC controller 80, the CPU 82 periodically transmits a value representing a vehicle identification number (commonly known as the VIN number) to the ECU 10 through the serial I/O port 90 over the serial link represented by line 48. This VIN number is stored in the EEPROM 88 at the factory and is used by the manufacturer to specifically identify each different vehicle that is produced.

Figure 4A:
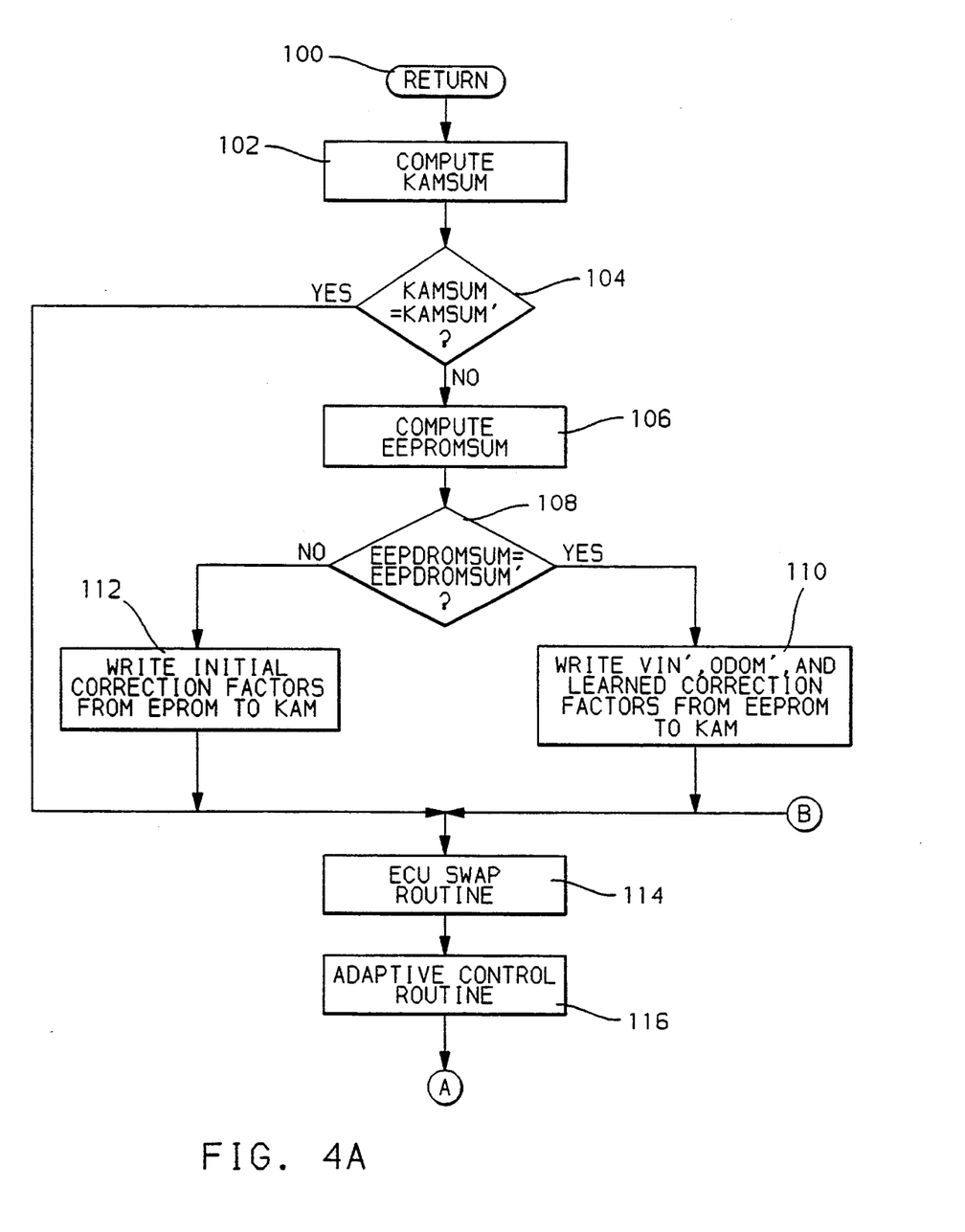
FIGS. 4A and 4B illustrates a flow diagram representative of the steps in an executive program executed by the ECU of FIG. 1, when adaptively controlling the operation of a vehicle engine and/or transmission.
Figure 4B:
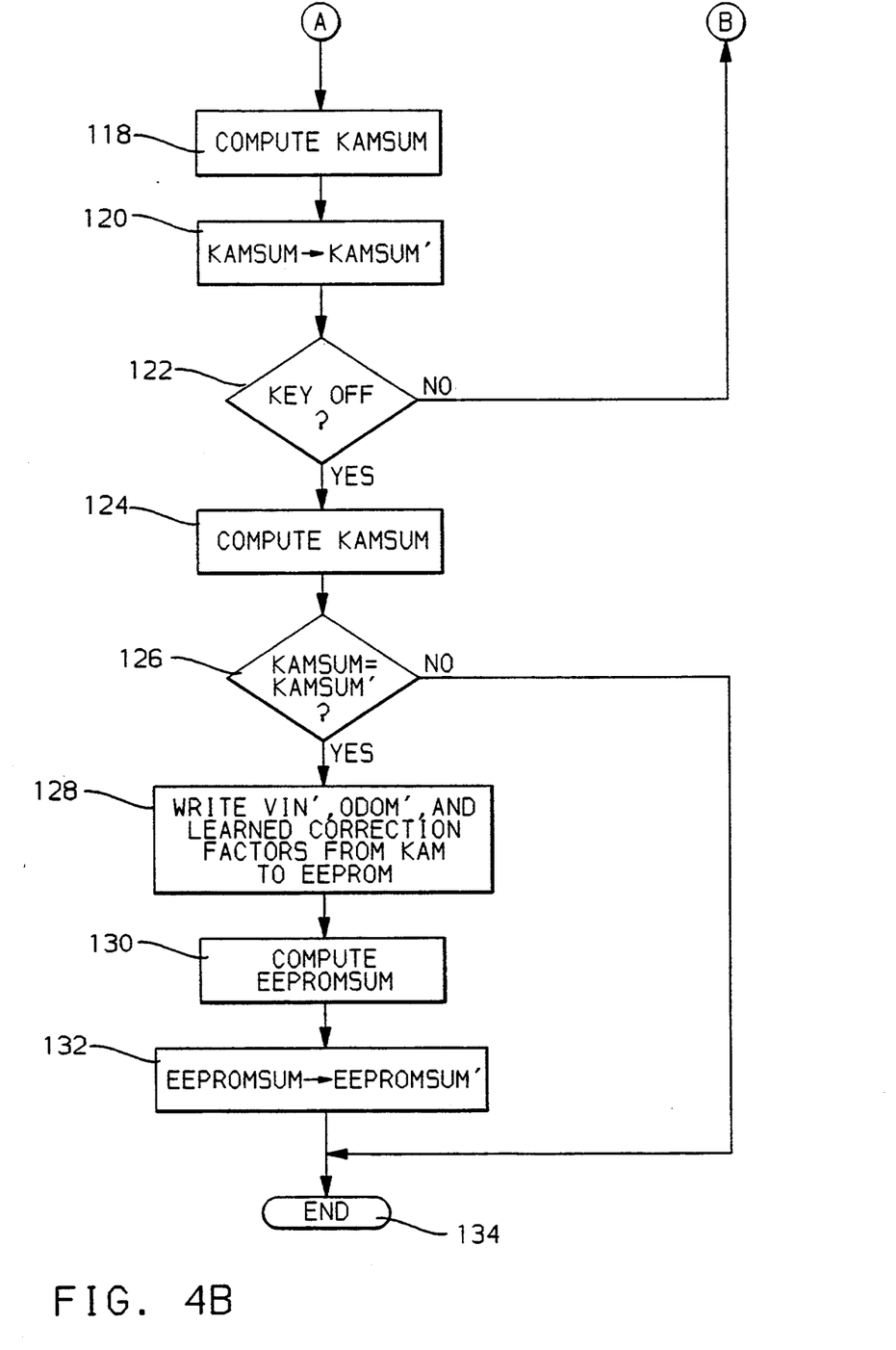

Referring now to FIGS. 4A and 4B, there is shown a flow diagram representative of the generalized steps in an executive program executed by the ECU 10 shown in FIG. 1, when adaptively controlling the operation of a vehicle engine and transmission. The program is stored in EPROM 16 and is executed by CPU 12 in the customary fashion.

The program is entered at point 100 when the ignition key is turned on (i.e., ignition switch 44 is closed). At this point, all of the appropriate counters, flags, registers, and timers within the ECU 10 are initialized to the proper starting values.

From point 100, the program proceeds to step 102 where a value for a variable KAMSUM is computed by summing up the values of bits in data bytes stored in a predetermined block of memory in KAM 18. As will be described subsequently, this block of KAM 18 contains values for correction factors used by the adaptive control system and other data transferred between KAM 18 and and a corresponding predetermined block of memory in EEPROM 20 during the execution of the executive program.

After completing step 102, the program proceeds to decision step 104. Here, the value of KAMSUM computed in the previous step 102 is compared with a previously computed value for KAMSUM stored as KAMSUM' in KAM 18 (see steps 118 and 120) the last time the vehicle was powered down by turning the ignition key off. If the value for KAMSUM does not equal the stored value KAMSUM', the content of the predetermined block of memory in KAM 18 has changed, which indicates that data in this memory block is invalid and should not be used. In this case, the program branches to step 106. If the value of KAMSUM equals the stored value of KAMSUM', the data in the memory block of KAM 18 is presumed to be valid and the program branches to step 114.

When the program branches from 104 to step 106 due to invalid data stored in the memory block of KAM 18, a value for a variable denoted as EEPROMSUM is computed by adding up the values of bits in data bytes stored in the block of memory in EEPROM 20 that corresponds to the predetermined block of memory in KAM 18.

From step 106, the program proceeds to decision step 108, where the value of EEPROMSUM computed at step 106 is compared with a a previously computed value for EEPROMSUM stored as EEPROMSUM' in EEPROM 20 (see steps 130 and 132) the last time the vehicle was powered down by turning the ignition key off. If the value for EEPROMSUM does not equal the stored value EEPROMSUM', the content of the memory block in EEPROM 20 has changed, which indicates that data in this memory block is invalid and should not be used. In this case, the program branches to step 112. If the value of EEPROMSUM equals the stored value of EEPROMSUM', the data in the memory block of EEPROM 20 is presumed to be valid and the program branches to step 110.

When the data stored in the memory block of EEPROM 20 is determined to be invalid at step 108, the program branches to step 112, where initial values for the adaptive control correction factors are written from EPROM 16 to the block of memory in KAM 18. These initial values for the correction factors are permanently stored in EPROM 16 and represent calibration or mean values that enable any vehicle to operate without malfunctioning, prior to learning correction factor values that optimize vehicle performance. After initializing the correction factors in KAM 18 with the values transferred from EPROM 16, the, program passes to step 114.

When the data stored in the memory block of EEPROM 20 is determined to be valid at step 108, the program branches to step 110, where saved values for VIN', ODOM' and learned correction factors are written from the memory block in EEPROM 20 to the memory block in KAM 18. The significance of the variables VIN' and ODOM' will be described at a later point in the specification. The saved correction factor values are the ones that were learned during pervious vehicle operation and were transferred from KAM 18 to EEPROM 20 the last time the ignition key was switched off (see step 128). From step 110, the program proceeds to step step 114.

From steps 104,110, or 112, the program passes to step 114, where a ECU SWAP ROUTINE is entered and executed in accordance with the present invention. Briefly, this routine determines whether the ECU 10 has been transferred to a second vehicle which is different from the one operated when learning the values for control parameter correction factors that are stored in EEPROM 20. If the ECU 10 has been transferred to a second vehicle, the learned values for the control parameters in EEPROM 20 are not used by the adaptive powertrain control system of the second vehicle. Instead, the initial (mean) values for the values for the correction factors are written into KAM 18 from EPROM 16, and these initial values are used by the adaptive control system to operate the second vehicle. The ECU SWAP ROUTINE will be described in more detail in the discussion related to FIGS. 5A and 5B that follows.

After executing the ECU SWAP ROUTINE at step 114, the program proceeds to step 116, where an ADAPTIVE CONTROL ROUTINE is entered and executed. Based upon inputs provided by vehicle sensors (see the representative lines 34 and 36 in FIG. 1), this routine generates the appropriate control signals to drive vehicle actuators (see the representative lines 38 and 40 in FIG. 1) to adaptively control the vehicle powertrain. Methods for adaptively controlling engines and transmissions are well known in the art (see for example, U.S. Pat. No. 5,080,064 issued to Buslepp et al.), and will only be described summarily here, so as to provide the necessary background information to assist in explicating the present invention.

Basically, the ADAPTIVE CONTROL ROUTINE computes values for control parameters that are used in generating control signals output from the ECU 10 to regulate such things as idle air flow, engine fueling, spark timing, exhaust emissions, and transmission shifting to name a few. When the engine is operated for the first time, these control parameters and correction factors for the control parameters are initialized to calibration or mean values stored in EPROM 16. As the engine operates, new values for the correction factors are learned in accordance with known adaptive algorithms. Learned values for the correction factors are stored in the predetermined memory block of KAM 18, and are then used to adjust the control parameters of the adaptive control system to optimized values. As a result, vehicle response and drivability are improved, while also compensating for aging and variations in powertrain components due to production tolerances.

After executing the ADAPTIVE CONTROL ROUTINE at step 116, the program proceeds to step 118. Here, a value for a variable KAMSUM is again computed by summing up the values of bits in bytes of data stored in the predetermined block of memory in KAM 18.

From step 118, the program passes to step 120, where the value for KAMSUM computed at step 118 is stored in KAM 18 as the the value for the variable KAMSUM'.

From step 120, the program proceeds to decision step 122, where a decision is made as to whether the vehicle ignition key has been turned off based on the input to the ECU 10 provided on line 42. If the ignition key has not been turned off, the program branches back to step 114 to repeat execution of steps 114 through 122, which comprises the main loop of the executive program. If the ignition key has been turned off, the program then proceeds to step 124.

At step 124, the program again computes a value for KAMSUM by summing up the values of the bits in the data bytes stored in same memory block of KAM 18, as in steps 102 and 118.

From step 124, the program proceeds to decision step 126. Here, the value of KAMSUM computed in the previous step 124 is compared with the value of KAMSUM' stored in KAM 18 at the prior step 120. If these two values are not equal, the contents of the predetermined block of KAM 18 has changed between steps 120 and step 126, and the data stored in the memory block is considered to be invalid. In this case, the program branches to point 134 where program execution ends for this on to off vehicle ignition cycle. If the values of KAMSUM and KAMSUM' are equal, the data in the memory block of KAM 18 is considered to be valid (i.e., the learned values for the correction factors), in which case, the program passes to step 128.

At step 128, the valid values of VIN', ODOM', and the learned control parameter correction factors in the predetermined memory block in KAM 18 are written and saved in the corresponding memory block in EEPROM 20.

After completing the transfer of the learned values of the correction factors to EEPROM 20, the program proceeds to step 130. Here, a value for a variable EEPROMSUM is computed by summing up the values of the bits in the data bytes stored in the memory block in EEPROM 20.

From step 130, the program proceeds to step 132, where the value computed for the variable EEPROMSUM at above step 130 is then stored in EEPROM 20 as the value of the variable EEPROMSUM'.

From step 132, the program proceeds to point 134 where execution ends, until the next vehicle ignition cycle.

Figure 5A:
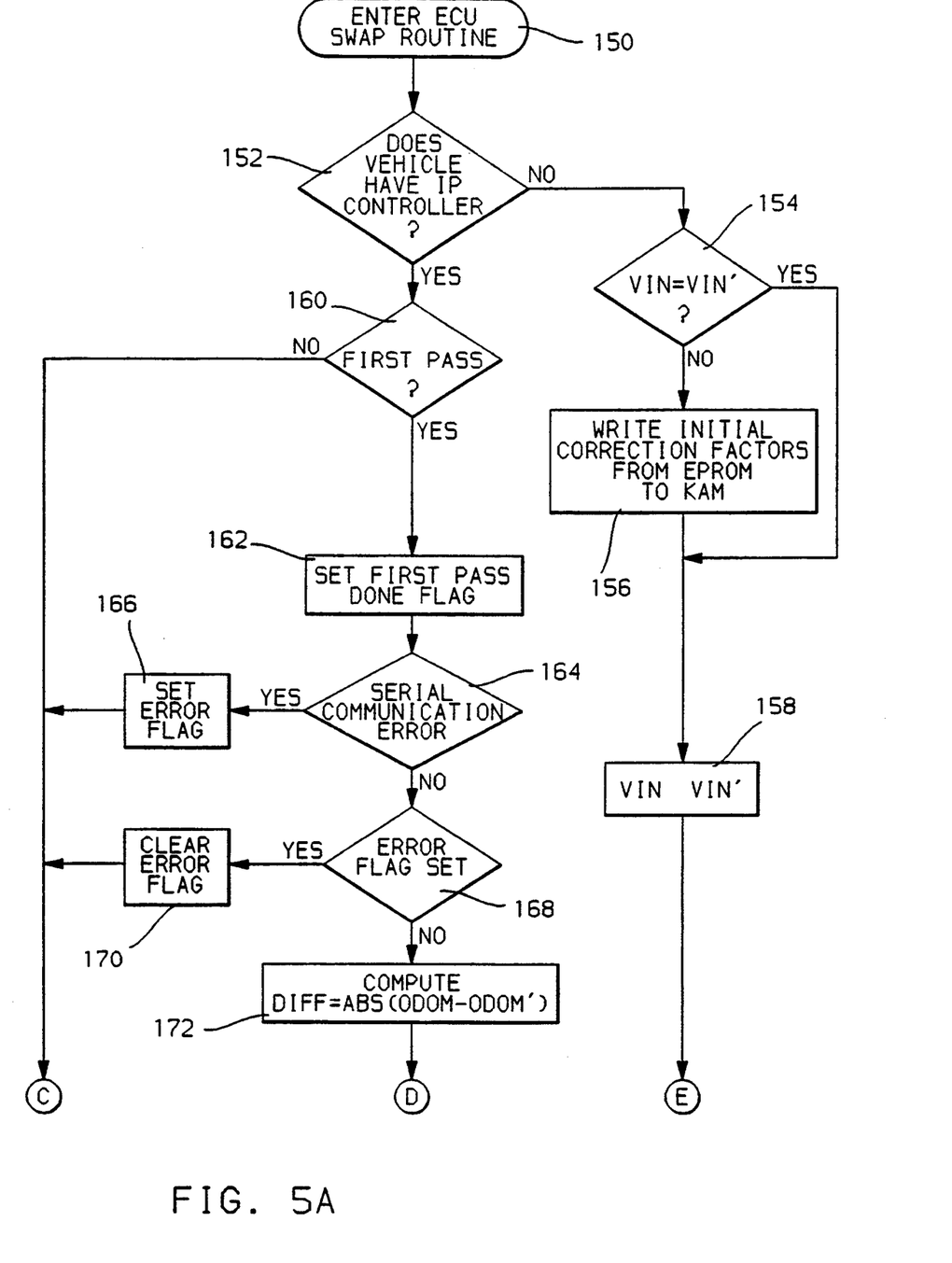
FIGS. 5A and 5B illustrates a flow diagram representative of the steps in a ECU swap routine forming part of the executive program illustrated in FIGS. 4A and 4B, which operates in accordance with the principles of the present invention.
Figure 5B:
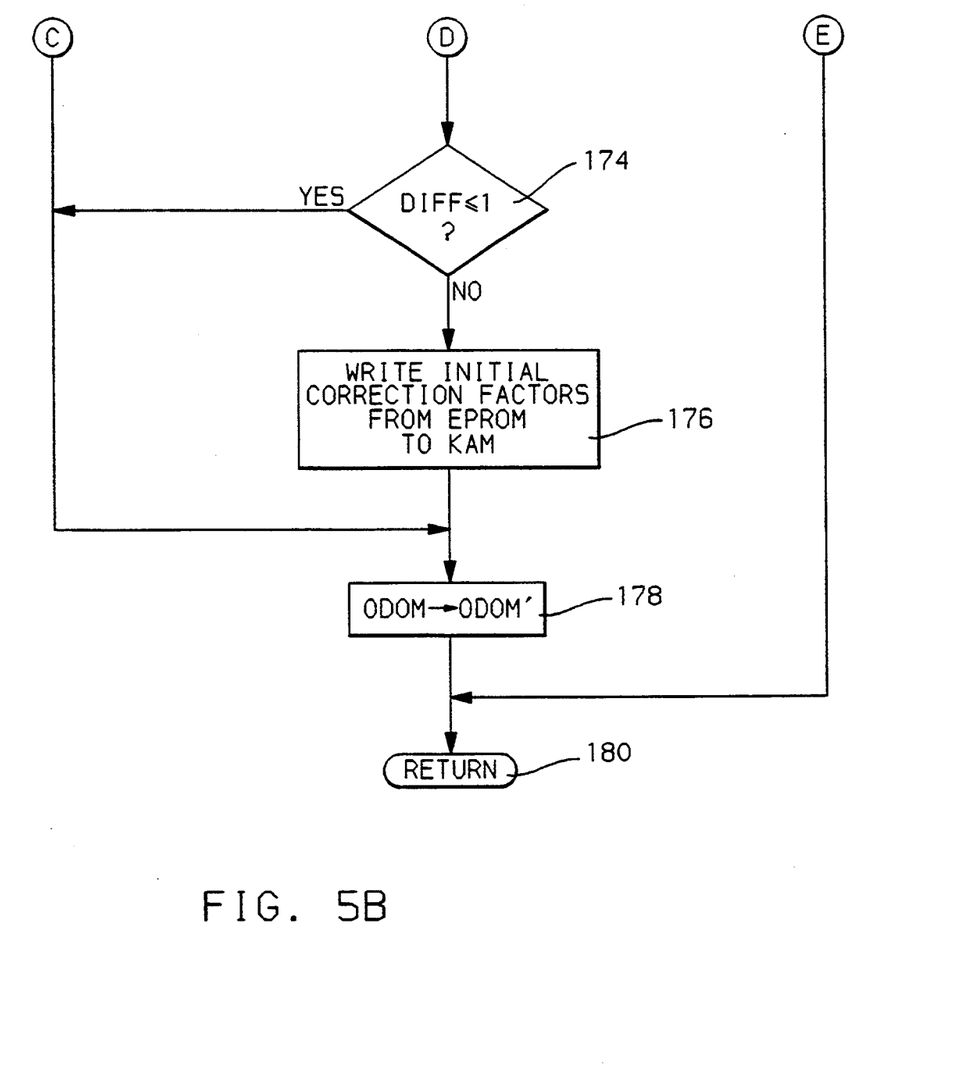

Referring now to FIGS. 5A and 5B, there is shown a flow diagram representative of the steps executed in the ECU SWAP ROUTINE that forms part of the above described executive program (see step 114 in FIG. 4A), which enables ECU 10 to operate in accordance with principles of the present invention. If ECU 10 is transferred from a first vehicle to a second vehicle without the ECU SWAP routine present in the executive program, the correction factors that were learned during the operation of the first vehicle and stored in EEPROM 20 will be transferred and used to adaptively control the operation of the second vehicle. As described previously, this can cause the second vehicle to malfunction due to differences between the powertrain components in the first and second vehicles.

The present invention overcomes this problem by enabling the ECU 10 to determine whether it has been transferred to a vehicle different from the one operated when learning the correction factors stored in EEPROM 20. If the ECU has been transferred to a second vehicle, the learned correction factors for the first vehicle are not used by ECU 10 when adaptively controlling the powertrain of the second vehicle. Instead, initial values for the correction factors that are permanently stored in EPROM 16 are transferred to KAM 18 for use in adaptively controlling the operation of the second vehicle. The second vehicle will then have to be operated non-optimally for a short period time until new values for the correction factors can be learned, but this is significantly more desirable than using correction factors learned while operating the first vehicle, which can cause the second vehicle to malfunction. As discussed previously, this can be particularly useful in the servicing environment where an ECU is often judged to be defective when it is transferred from a first vehicle, that is not operating properly, to a second vehicle, and the second vehicle then malfunctions.

The ECU SWAP ROUTINE is entered at point 150 and proceeds to step 152 where a decision is made regarding whether the ECU 10 is implemented in a vehicle that is equipped with an IP controller 50 (see FIG. 2), or a HVAC controller 80 (see FIG. 3). This decision is based upon the value of an IPC bit that is permanently stored in EPROM 16. For example, the IPC bit is typically set to a logic 1 value when the ECU 10 is to be used in vehicles equipped with IP controllers 50, or the IPC bit is set to a logic 0 value when the ECU 10 is to be used in vehicles equipped with HVAC controllers 80. From step 152, the routine then branches to step 160 if IPC is set to a logic 1 value, or it branches to step 154 if IPC is set to a logic 0 value.

When the routine branches to step 154, the ECU 10 compares the value of the vehicle VIN number sent by the HVAC controller 80 over the bi-directional serial link with a stored value for the variable VIN' stored in KAM 18. The stored value of VIN' represents the identification number of the vehicle that the ECU 10 was installed in when learning the values of the correction factors that are presently stored in EEPROM 20. When the VIN number sent over the serial link matches the VIN' number stored in KAM 18, this indicates that the ECU 10 has not been transferred to a different vehicle and the routine branches to step 158. However, if the VIN number does not match the stored VIN' number, the ECU 10 has been transferred to a different vehicle, and the routine then proceeds to step 156.

When the routine passes from step 154 to step 156, the the initial values (the mean values) for the correction factors stored in EPROM 16 are written to the memory block in KAM 18. Since the ECU 10 has been transferred to a different vehicle, the initial values for the correction factors are written to KAM 18 to replace the learned values that were previously written there from EEPROM 20 at step 110 of the executive program (see FIG. 4A). This assures that correction factor values learned during the operation of a first vehicle will not be used to adaptively control the operation of a second vehicle, when the ECU 10 is transferred from the first vehicle to the second vehicle. After completing step 156, the routine proceeds to step 158.

It will be recognized that step 156 is bypassed when the value of the VIN number matches the stored value of VIN' at step 154. As a result, the learned values for the correction factors that have been written from EEPROM 20 to KAM 18 will be used in adaptively controlling the operation of the vehicle since the ECU 10 will not have been transferred to a different vehicle.

At step 158, the current value for VIN transmitted over the serial data link 48 replaces the value of VIN' stored in KAM 18. When the ECU 10 remains in the same vehicle, the value of VIN will be equal to the value of VIN' so no change results. However, if the ECU 10 has been transferred to a different vehicle, the VIN number of that vehicle replaces the value of VIN' stored in KAM 18. This is done to bypass step 156 during subsequent passes through the routine so that the transferred ECU 10 can begin learning and using new values for the correction factors. After completing this step 158, the routine passes to point 180 and returns to the executive program.

Returning now to decision step 152, if it is determined that the ECU 10 is residing in a vehicle that is equipped with an IP controller 50, the routine proceeds to step 160, where a decision is made regarding whether this is the first pass through this part of the routine for the present ignition cycle, i.e., since the ignition key was turned to the on position. This decision is made based upon the status of a FIRST PASS DONE FLAG. The FIRST PASS DONE FLAG is initialized to a logic 0 value at point 100 in the executive program after the ignition key is turned to the on position (see FIG. 4A). Consequently, when the FIRST PASS DONE FLAG has a logic 0 value at step 160, the routine is directed to step 162, otherwise the routine branches to step 178.

At step 162, the FIRST PASS DONE FLAG is set to a logic 1 value and the routine then passes to decision step 164. It will be recognized that after the FIRST PASS DONE FLAG is set at step 162, the routine will always branch to step 178 from step 160 on subsequent passes through the routine, until the ignition key is turned off and then on again to initialize the flag back to a logic 0 value at point 100 in the executive routine (see FIG. 4A).

From step 162, the routine proceeds to step 164, where a decision is required regarding the occurrence of a serial communication error. If an error has been detected in data sent from the IP controller 50 to the ECU 10 over the bi-directional serial data link 48 during the present ignition cycle, the routine proceeds to step 166. If an error in the serial data has not been detected during the present ignition cycle, the routine proceeds to step 168.

Serial communication errors are detected using conventional techniques well known in the art. In the preferred embodiment, the last byte in a group of bytes sent over the serial data link 48 contains the sum of all the bit values in the succeeding bytes. The CPU 12 sums up the bit values of all bytes (except the last one,) received over the serial data link 48, and compares this sum with the value of the last received byte. If these sums do not agree, the CPU 12 sets a serial error flag in KAM 18 to a logic 1 value. Consequently, if the serial error flag is set to a logic 1 value at step 164, the routine proceeds to step 166, otherwise it proceeds to step 168.

When the routine is directed to step 166, an ERROR FLAG is set to a logic 1 value, and the routine then proceeds to step 178. This ERROR FLAG is retained from one ignition cycle to the next in KAM 18 and is not reset during initialization at point 100 in the executive program. Thus, the setting of the ERROR FLAG is used to indicate that a communication error was detected during the immediately preceding ignition cycle.

When the routine is directed to step 168 from step 164, a decision is required as to whether a serial communication error was detected during the immediately preceding ignition cycle. This decision is made based upon the status of the ERROR FLAG. If the ERROR FLAG is set to a logic 1 value, a serial error occurred during the last ignition cycle and the routine is directed to step 170, otherwise the routine proceeds to step 172. When the routine is directed to step 170, the ERROR FLAG is reset to a logic 0 value because a serial communication error was not detected during the present pass through this portion of the routine. The routine then proceeds to step 178.

It will be recognized that step 172 in the routine can only be reached if a serial communication error has not been detected during the present ignition cycle or the immediately preceding ignition cycle. This double check on the integrity of the serial data link 48 is done to ensure that valid serial data is being received from the IP controller 50, before proceeding to step 172.

Recall that the IP controller 50 periodically sends the vehicle odometer value over the serial data link to the ECU 10. The odometer value received by ECU 10 is stored in KAM 18 as the value for a variable designated as ODOM.

At step 172, the value for a variable designated as DIFF is determined by calculating the absolute value (ABS) of the difference between the value of ODOM sent over the serial data link 48 and a value for another variable designated as ODOM'. As will be described shortly, the value of ODOM' represents the most recently stored value for the odometer of the vehicle that was operated when learning the values of the correction factors stored in EEPROM 20.

From step 172, the routine proceeds to step 174, where a decision is made based upon the value of DIFF calculated at step 172. If DIFF is less than or equal to 1, the routine branches to step 178. If DIFF is greater than 1, the routine proceeds to step 176. When the DIFF is less than or equal to 1, the odometer value sent over the serial data link 48 from the vehicle IP controller 50 (stored as ODOM in KAM 18) differs from stored value of ODOM' by no more than a value of plus or minus 1. This indicates that the ECU 10 has not been transferred to a different vehicle, since the probability is very small that any two vehicles would have the odometer values that differ by not more than a count of plus or minus 1. The two values of ODOM and ODOM' are allowed to differ by a value of plus or minus 1 without passing to step 176 to account for the delay in receiving an updated odometer value from the IP controller 50 over the serial data link 48.

When the routine is directed from decision step 174 to step 176, the values of ODOM and ODOM' differ by more than plus or minus 1, which indicates that the ECU has been transferred from a first vehicle to a second vehicle. In this case, the correction factors learned while operating the first vehicle can not, be used to operate the adaptive control system of the, second vehicle. Consequently, the initial values for the correction factors stored in EPROM 16 are written to KAM 18, to replace the learned values written there from EEPROM 20 at step 110 in the executive program (see FIG. 4A). When this operation is completed, the routine passes to step 178.

At step 178, the value of ODOM' in KAM 18 is replaced with the value of ODOM sent over the serial data link from the IP controller 50. From step 178, the routine passes to point 180 where the routine returns to the executive program.

It will be understood that the values for VIN' and ODOM' are transferred between the predetermined memory blocks of EEPROM 20 and KAM 18 at steps 110 and 128 in the executive program along with the values of the learned correction factors. This ensures that the value of VIN' or ODOM' (whichever is being used to for vehicle identification) saved in EEPROM 20 correspond to the vehicle that was operated when learning the values of the correction factors that are also stored in EEPROM 20.

From the foregoing, it will be recognized that the ECU 10 receives an identification signal from a vehicle that is employing the ECU 10 for adaptive powertrain control. In one implementation, the identification signal represents the vehicle odometer value, and in another implementation the identification signal represents the value of the vehicle VIN number. The ECU 10 compares the value of the received identification signal with a stored value representing the identification of a vehicle in which the ECU 10 was employed when learning the adaptive control correction factors that are in the ECU's non-volatile memory. Based upon this comparison, the ECU determines whether it has been transferred between vehicles. If the ECU has been transferred to a different vehicle, the learned values for the correction factors stored in non-volatile memory are not used when adaptively controlling the vehicle, and the correction factors are initialized to mean values. If the ECU has not been transferred to a different vehicle, the learned values for the correction factors are then used in adaptively controlling the vehicle powertrain.

In the preferred embodiment described above, the ECU 10 was implemented to receive a vehicle identification signal that could represent either the vehicle odometer value or the vehicle VIN number. It will be recognized that the ECU 10 could be implemented to receive only one of these forms of vehicle identification signal by eliminating decision step 152 in the ECU SWAP ROUTINE of FIG. 5A, and then proceeding directly to either step 154 or to step 160 from point 150, depending upon the form of the vehicle identification signal to be received. Also, the vehicle identification signal could be derived from sources on the vehicle other than those specifically described in the specification, for example, from a vehicle security or anti-theft system that has a code for distinguishing between different vehicles.

Also, in the preferred embodiment, the learned values for the correction factors were described as being stored in EEPROM 20 when the vehicle ignition system was switched off. It will be recognized that the invention would provide the same advantages if the EEPROM 20 were to be replaced with a high capacitance CMOS memory that was capable of retaining the learned values of the correction factors and other data for a time sufficient to complete a transfer of the ECU 10 between vehicles. Thus, the aforementioned description of the embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. A transferable electronic control unit for a vehicle adaptive control system that includes a non-volatile memory, wherein vehicle operation is controlled based upon the values of control parameters that are adjusted according to correction factor values that are adaptively learned and updated during vehicle operation and retained in the non-volatile memory when vehicle operation ends; the electronic control unit comprising:

means for determining whether the electronic control unit has been transferred from a first vehicle to a second vehicle;

means for using the correction factor values retained in said non-volatile memory to begin adaptively controlling vehicle operation when it is determined that the electronic control unit has not been transferred to the second vehicle; and     means for setting the correction factor values equal to predetermined initial values and for using the predetermined initial values to begin adaptively controlling vehicle operation when it is determined that the electronic control unit has been transferred to the second vehicle.

2. A transferable electronic control unit for adaptively controlling the operation of motor vehicles, wherein the electronic control unit includes means for controlling vehicle operation based upon the values of control parameters that are adjusted according to learned correction factors, the learned correction factors having values that are adaptively updated during vehicle operation to optimize vehicle performance; the electronic control unit comprising:

means for receiving an identification signal having a value that identifies the vehicle in which the electronic control unit is currently operating;

a random access memory for storing values of the identification signal and the learned correction factors that acre updated during vehicle operation;

a first non-volatile memory containing predetermined initial values for the learned correction factors;

a second non-volatile memory;

means for writing the values of the identification signal and the learned correction factors stored in the random access memory to the second non-volatile memory as saved values for the identification signal and said learned correction factors when vehicle operation ends;

means for determining whether the electronic control unit has been transferred between vehicles based upon the value of the received identification signal and the saved value of the identification signal;

means for ensuring that the values of the identification signal and the learned correction factors stored, in the random access memory are equivalent to the saved values for the identification signal and the learned correction factors stored in the second non-volatile memory, when vehicle operation begins and the electronic control unit is determined not to have been transferred between vehicles; and     means for writing the initial values for the learned correction factors stored in the first non-volatile memory to the random access memory to replace the values of the learned correction factors stored therein when vehicle operation begins and said electronic control unit is determined to have been transferred between vehicles.

3. The transferable electronic control unit described in claim 2, wherein the random access memory is a keep alive memory powered by a vehicle battery.

4. The transferable electronic control unit described in claim 2, wherein the first non-volatile memory is an electrically programmable read only memory.

5. The transferable electronic control unit described in claim 2, wherein the second non-volatile memory is an electrically erasable and programmable read only memory.

6. The transferable electronic control unit described in claim 2, wherein the identification signal represents a vehicle odometer value.

7. The transferable electronic control unit described in claim 2, wherein the identification signal represents a vehicle identification number.

8. The transferable electronic control unit described in claim 2, wherein the means for determining whether the electronic control unit has been transferred between vehicles further includes means for determining whether the received value of the identification signal represents one of a vehicle odometer value and a vehicle identification number.

* * * * *